Nov. 22, 1927.  
S. B. HASELTINE  
1,650,352  
FRICTION SHOCK ABSORBING MECHANISM  
Filed Oct. 29, 1923  
2 Sheets-Sheet 1
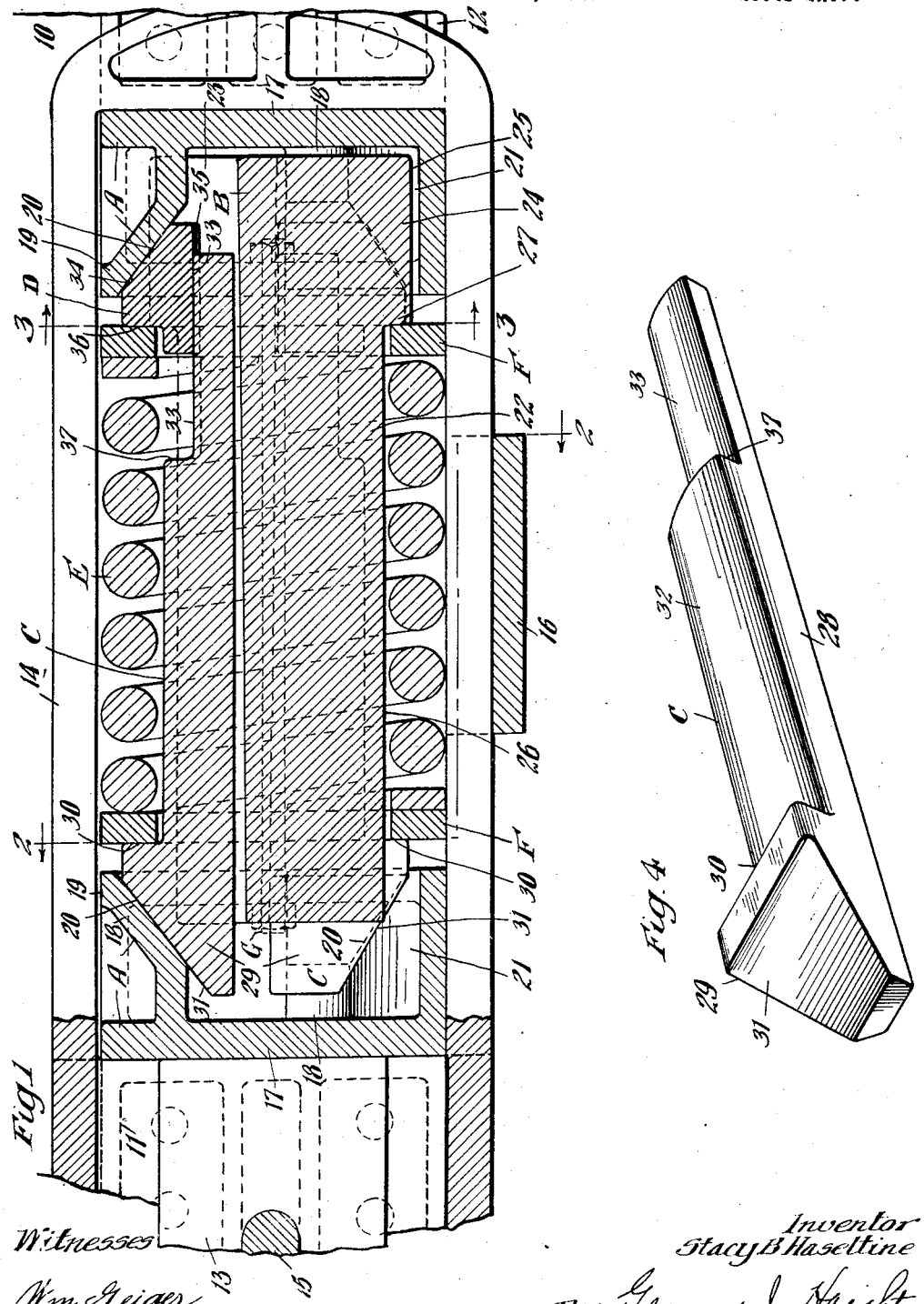
Witnesses  
Wm. Geiger
Inventor  
Stacy B Haseltine  
By George J. Haight  
His Atty Nov. 22, 1927.     S. B. HASELTINE     1,650,352
FRICTION SHOCK ABSORBING MECHANISM
Filed Oct. 29, 1923     2 Sheets-Sheet 2
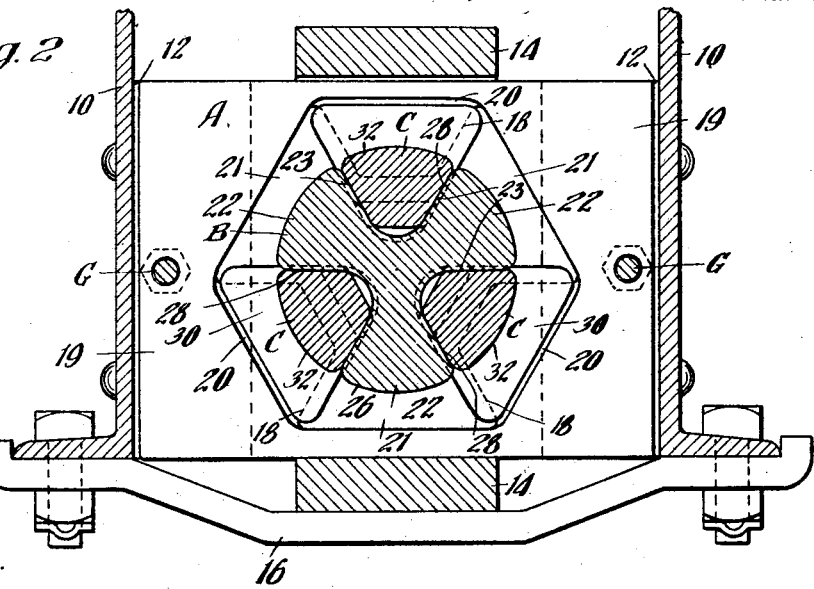
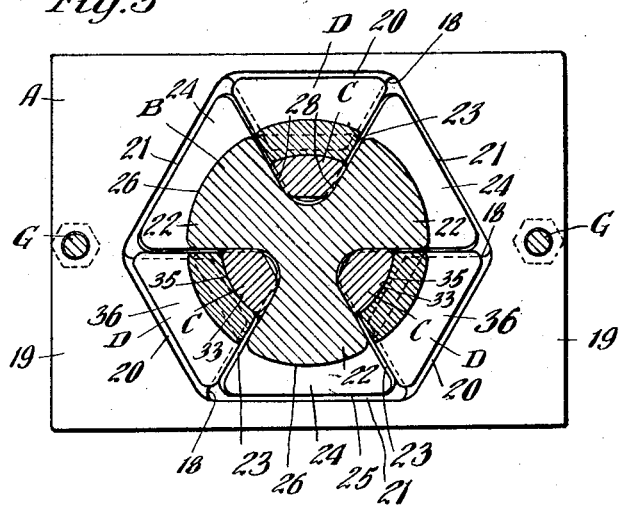
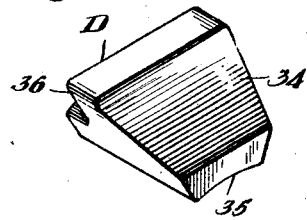
Witnesses
Wm. Geiger
Inventor
Stacy B. Haseltine
By George I. Haight
His Atty.

Patented Nov. 22, 1927.

1,650,352

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed October 29, 1923. Serial No. 671,275.

This invention relates to improvements in friction shock absorbing mechanisms.

One object of the invention is to provide a friction shock absorbing mechanism especially adapted for railway draft riggings, wherein is obtained high frictional capacity combined with assured release.

More specifically an object of this invention is to provide a mechanism of the character indicated in the foregoing, wherein are employed a friction post, a wedge pressure transmitting means and a plurality of friction wedge elements cooperating with the post.

Other objects and advantages of the invention will more clearly appear from the description and claims hereinafter following.

In the drawing forming a part of this specification, Figure 1 is a longitudinal, vertical, sectional view of a portion of a railway draft rigging, showing my improvements in connection therewith. Figure 2 is a vertical, sectional view corresponding substantially to the line 2—2 of Figure 1. Figure 3 is a vertical, sectional view corresponding substantially to the line 3—3 of Figure 1, the side sills and the yoke being omitted. Figure 4 is a detailed perspective view of one of the wedge friction bars. And Figure 5 is a detailed perspective view of one of the wedge friction shoes.

In said drawings, 10—10 denote the usual channel, draft or center sills of the car under-frame, each of the sills having secured to the inner face thereof, front and rear stop lugs 11 and 12 of usual construction, the stop lugs on one of the center sills only being shown in the drawing. A portion of the drawbar is indicated at 13, the same having a yoke 14 operatively connected thereto by a transverse key 15 of usual construction. Within the yoke is disposed the shock absorbing mechanism proper, hereinafter described. The yokes and parts contained therein are supported in operative position by a detachable saddle plate 16.

My improved shock absorbing mechanism proper, as shown, comprises broadly, front and rear combined follower and wedge members A—A; a friction post B; three friction wedge bars C—C; three friction wedge shoes D—D; a spring resistance E; a pair of spring follower rings F—F; and a pair of retainer bolts G—G.

The front and rear combined follower and wedge members A—A are of like construction, each being in the form of a hollow casting comprising an outer wall 17, a hollow hexagonal section 18 and laterally extending flanges 19 at the inner end of the section 18. The walls of the hexagonal section are disposed symmetrically about the longitudinal axis of the mechanism, three alternate walls being inclined away from said axis thereby providing three wedge faces 20, and the remaining three walls being disposed in planes parallel to the axis of the mechanism, thereby providing recesses 21 alternating with the wedge faces 20. The outer walls 17 of the followers are adapted to coact respectively with the front and rear stop lugs of the draft sills.

The friction post B is provided with three equally spaced radially disposed arms 22, thereby providing three pairs of longitudinally extending friction surfaces 23, the faces of each pair converging toward the axis of the mechanism and being substantially radial to said axis. As clearly shown in Figures 2 and 3, the opposed surfaces 23 also converge slightly rearwardly of the mechanism. At the rear end each of the arms 22 is enlarged laterally thereby providing a head 24. The outer face of each head is flat as indicated at 25 and disposed in a plane parallel to the axis of the mechanism. The head 24 of each arm is of such a size and shape as to be accommodated in the corresponding recess 21 of the rear follower A. The outer face of each arm from the head 24 to the front end of the post B is curved transversely to the axis of the mechanism as indicated at 26 and extends in parallel relation thereto. The front end face of each head provides an abutment shoulder 27 adapted to coact with the rear spring follower ring F. The rear end of the post B, as shown, is normally slightly spaced from the inner side of the wall 17 of the rear follower, and is resisted by the spring E, which has one end thereof bearing on the rear spring follower F, thus being free to move to a limited extent relatively to the rear follower. The post is of such a length that the front end thereof is normally spaced a sufficient distance from the wall 17 of the front follower to permit full movement of the parts of the mechanism during the compression stroke.

The three friction wedge bars C are of like construction, each having a pair of relatively long longitudinally extending inner friction surfaces 28 converging toward and slightly rearwardly of the axis of the mechanism, adapted to coact with a corresponding pair of surfaces 23 of the post B. At the front end each bar is provided with a head 29 thereby providing a shoulder 30 adapted to coact with the front spring follower ring F. Each bar C has an outer wedge face 31 similarly inclined to and coacting with one of the wedge faces 20 of the front follower A. The outer surface of each bar C, rearwardly of the head 29, is rounded transversely on an arc concentric to the axis of the mechanism as indicated at 32. At the rear end each bar C has the outer face thereof stepped inwardly, presenting a longitudinally extending friction surface 33. The friction surface 33 of each bar C is preferably cylindrical and has its axis concentric to the axis of the mechanism, the faces 33 of all of the bars C having a common axis.

The shoes D are three in number and are of like construction, each being in the form of a solid block having an outer wedge face 34 correspondingly inclined to and coacting with one of the wedge faces 20 of the rear follower A and an inner cylindrical friction surface 35 corresponding to and coacting with the friction surface 33 of one of the bars C. At the opposite sides each of the blocks D is cut away on planes radial to the adjacent surfaces 33 of the post B, a slight clearance being left between the side faces of the block D and the faces 23 of the post to permit the wedge block to be forced radially inwardly toward the axis of the mechanism to bring the friction surfaces 35 into intimate contact with the faces 33 of the bars C. At the front end each block is cut away to provide an abutment face 36 adapted to coact with the rear spring follower ring F. The shoes D, the bars C and the post B are so proportioned and designed that the front ends of the shoes D, the rear ends of the bars C and the opposite ends of the post B will respectively come into abutment substantially simultaneously with the shoulders 37 between the surfaces 32 and 33 of the bars, the rear follower, and the front and rear followers, thereby limiting the relative movement of the parts. The members B, C and D thus act as a solid column to transmit the force directly from one follower to the other.

The spring resistance E bears at opposite ends on the front and rear follower rings F, which in turn abut the heads 29 of the bars C, and the shoulders 36 of the shoes D. The rear spring follower ring F also coacts with the shoulders 27 of the post B.

The retainer bolts G—G are two in number and are arranged on opposite sides of the gear midway of its height, each bolt having the opposite ends thereof anchored respectively in the flanges 19 of the front and rear followers A.

The parts are assembled with the spring under an initial compression so that the shoes D and the bars C are yieldingly forced apart longitudinally to compensate for wear of the various coacting friction surfaces. The retainer bolts G limit the relative separating movement of the followers A and maintain the proper length of the gear.

The operation of the device is as follows, assuming a compression stroke of the mechanism. As the front follower A is forced inwardly of the gear there will be initially, a wedging action set up between the wedge faces of the front follower A and the bars C and between the wedge faces of the rear follower A and the wedge friction shoes D. During this initial action there will be a slight relative movement between the friction post B and the rear follower before the rear end of the post engages the wall 17 of the follower due to the clearance between these parts thereby permitting the relative movement necessary between the rear follower A and the wedge blocks D to set up the proper wedging action, at the same time moving the shoulder 27 away from the follower ring F. The clearance thus provided between the follower ring and the head of the post permits the full reactive effort of the spring E in release to free the shoes before any movement of the post is effected. During further inward movement of the front follower A, the post B will be held substantially stationary by engagement with the rear follower and the friction bars C will be slid rearwardly on the friction surfaces of the post. As the friction bars C move rearwardly, the same will slide relatively to the shoes D which are held substantially stationary by engagement with the wedge faces of the rear follower, the friction surfaces 33 sliding on the friction surfaces 35, thereby affording additional frictional resistance to the relative movement of the followers. A differential wedge action is also produced due to the longitudinal taper of the arms of the post and the elements C. This action continues until the wall 17 of the front follower abuts the front end of the post B, the front ends of the shoes D abut the shoulders 37 of the bars C, and the rear ends of the bars C abut the wall 17 of the rear follower, whereupon the pressure will be transmitted directly through the post B, bars C and shoes D from the front follower to the rear follower, the parts acting as a substantially solid column.

Upon removal of the compression force, the wedging action will be substantially instantly reduced due to the relatively wide included angle between the wedge faces 20 of the front and rear followers. When the wedging pressure has been removed, the expansion of the spring resistance E will restore the parts to normal position, rearward movement of the post B beyond the position shown in Figure 1 being prevented due to the frictional resistance offered by the engaging faces of the post and the bars C.

During draft the action will be the reverse of that just described, the front follower being held stationary and the rear follower being moved forwardly by the yoke 14.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a central friction element; of a series of friction shoes having sliding frictional engagement with said element; a second series of friction shoes having sliding frictional engagement with said first named friction shoes, said first and second named shoes being movable toward and from each other longitudinally of the mechanism; a spring resistance interposed between, and opposing relative movement of, said first and second named shoes; and wedge pressure transmitting means coacting with all of said shoes.

2. In a friction shock absorbing mechanism, the combination with a central friction element having longitudinally disposed friction surfaces; of a plurality of bars having friction surfaces coacting with said first named friction surfaces; a plurality of friction shoes slidable on said bars; means for yieldingly opposing relative movement of said shoes and bars; and wedge pressure transmitting means having wedging engagement with said bars at one end for forcing the same against said central friction element and having wedging engagement with said shoes for forcing the same against said bars.

3. In a friction shock absorbing mechanism, the combination with a plurality of relatively movable friction elements having longitudinally disposed co-operating friction surfaces, certain of said elements having wedge faces; a plurality of friction shoes, said shoes and said elements provided with the wedge faces having co-operating longitudinally disposed friction surfaces, said shoes also having wedge faces; a spring resistance interposed between said elements having the wedge faces and wedge shoes; and pressure transmitting means having wedge faces coacting with the wedge faces of said elements and shoes.

4. In a friction shock absorbing mechanism, the combination with front and rear followers, said followers having wedge faces thereon; of a floating friction post adapted to engage one of said followers and held against movement relatively thereto during the compression stroke; a plurality of friction shoes having wedge faces coacting with said last named follower; a plurality of friction elements coacting with said post and shoes, said elements having wedge faces thereon adapted to coact with the other follower; and a spring resistance interposed between said shoes and elements.

5. In a friction shock absorbing mechanism, the combination with a pair of followers having wedge faces thereon; of a movable friction post adapted to have its movement limited by one of said followers; friction elements coacting with said post; friction shoes coacting with said elements, said elements and shoes having wedge faces coacting with said followers; and a spring resistance coacting with said elements, shoes and post for restoring the same to normal position upon reduction of the compression force.

6. In a friction shock absorbing mechanism, the combination with a pair of movable followers; of a central friction element adapted to abut both of said followers when the mechanism is fully compressed; a series of friction shoes coacting with said element and adapted to have their movement limited by one of said followers; a second series of friction shoes coacting with said first named shoes; a spring resistance; wedge pressure transmitting means coacting with said shoes; and coacting abutment means on said first and second named shoes respectively adapted to limit the relative movement thereof.

7. In a friction shock absorbing mechanism, the combination with a central friction element having longitudinally disposed friction surfaces; of a plurality of friction bars having friction surfaces coacting with the friction surfaces of said element, said bars having abutment faces thereon; a plurality of friction shoes coacting with said bars and having their movement limited by said abutment faces; yielding means opposing relative movement of said shoes and bars; and wedge pressure transmitting means coacting with said bars and shoes.

8. In a friction shock absorbing mechanism, the combination with front and rear followers having wedge faces thereon; of friction shoes having wedge faces coacting with the wedge faces of one of said followers; of elongated friction elements each having a plurality of friction surfaces, one of which slidingly cooperates with one of said shoes, said elements having wedge faces thereon coacting with the wedge faces of the other follower; of a central friction element having friction surfaces coacting with the remaining friction surfaces of said first named elements; and a spring resistance opposing relative movement of said shoes and said first named elements.

9. In a friction shock absorbing mechanism, the combination with a friction post having a plurality of pairs of longitudinally disposed friction surfaces thereon; of a series of three friction elements coacting with said post, each of said elements having a pair of inner friction surfaces coacting with one of said first named pairs of friction surfaces, each of said elements also having an outer friction surface; three shoes each having an inner friction surface coacting with the outer surface of one of said elements; means yieldingly resisting relative movement of said shoes and elements; and wedge pressure transmitting means coacting with said shoes and elements.

10. In a friction shock absorbing mechanism, the combination with a friction post having radially extending arms provided with longitudinally extending friction surfaces; of a series of friction elements having inner friction surfaces coacting with said post friction surfaces, each of said elements also having an outer friction surface; a series of friction shoes each having an inner friction surface coacting with the outer surface of one of said elements; means for yieldingly opposing relative movement of said shoes and elements; and wedge pressure transmitting means coacting with said shoes and elements.

11. In a friction shock absorbing mechanism, the combination with two follower members at opposite ends of the mechanism; of a longitudinally arranged friction post interposed between said followers, said post having the opposite ends thereof disposed adjacent said followers respectively, said post being provided with a plurality of friction surfaces extending longitudinally thereof; a plurality of relatively elongated friction shoes having friction surfaces cooperable with said surfaces of the post, the friction shoes being arranged around the post; a spring resistance; and means at the opposite ends of the mechanism, co-operating respectively with the opposite ends of each shoe for wedging the opposite ends of said shoes inwardly against the post upon relative approach of said followers.

12. In a friction shock absorbing mechanism, the combination with two relatively movable main followers; of a longitudinally arranged friction post between said followers having friction surfaces extending the full length thereof, said post abutting one of said followers during the major portion of the compression stroke; a plurality of friction shoes movable in unison with one of said followers having friction surfaces cooperating with the friction surfaces of the post; a spring resistance; and wedge means on said main followers coacting with the opposite ends of said shoes to wedge the same inwardly against the post upon relative approach of said followers.

13. In a friction shock absorbing mechanism, the combination with front and rear main followers; of a friction post having a plurality of pairs of longitudinally disposed friction surfaces forming re-entrant angles; of a plurality of relatively elongated friction shoes having friction surfaces cooperable with the surfaces of said post, the friction shoes being arranged around the post; a spring resistance; and means movable in unison with both of said main followers for wedging the opposite ends of said shoes inwardly against the post.

14. In a friction shock absorbing mechanism, the combination with two end follower members; of a longitudinally arranged friction post intermediate said followers, said post being provided with three sets of longitudinally disposed friction surfaces; a plurality of relatively elongated friction shoes having friction surfaces cooperable with said surfaces of the post; a spring resistance; and means movable with the respective end followers for wedging the opposite ends of said shoes inwardly against the post upon relative approach of said followers.

15. In a friction shock absorbing mechanism, the combination with two end follower members movable relatively toward and away from each other; of a friction post having friction surfaces disposed longitudinally of the mechanism; a plurality of relatively elongated friction shoes having friction surfaces cooperable with said surfaces of the post; a spring resistance; and means on said end followers for wedging the opposite ends of said shoes inwardly against the post upon relative approach of said followers.

16. In a friction shock absorbing mechanism, the combination with a friction post having a plurality of pairs of longitudinally converging friction surfaces thereon; of a series of three friction elements coacting with said post, each of said elements having a pair of inner friction surfaces correspondingly inclined to and coacting with one of said first named pairs of friction surfaces, each of said elements also having an outer friction surface; three shoes, each having an inner friction surface coacting with the outer friction surface of one of said elements; means yieldingly resisting relative movement of said shoes and elements; and wedge pressure transmitting means coacting with said shoes and elements.

17. In a friction shock absorbing mechanism, the combination with a friction post having radially extending, longitudinally tapered arms; of a series of friction elements coacting with the tapered arms of said post;

a series of friction shoes coacting with said elements; means for yieldingly opposing relative movement of said shoes and elements; and wedge pressure transmitting means coacting with said shoes and elements.

18. In a friction shock absorbing mechanism, the combination with two end followers relatively movable toward each other; of a longitudinally disposed friction post, said post and one of said followers being relatively movable during the major portion of the compression stroke of the mechanism and said post, and the other follower having slight relative movement to provide for preliminary action; a plurality of elongated friction shoes co-operable with said post; a spring resistance; and means at opposite ends of the mechanism for wedging the opposite ends of each shoe inwardly against the post upon relative approach of said followers.

In witness that I claim the foregoing I have hereunto subscribed my name this 27th day of October 1923.

STACY B. HASELTINE.